United States Patent Office
3,740,387
Patented June 19, 1973

3,740,387
REACTION PRODUCTS OF NITRO-NITRITO ALKANES WITH ALKYLENE POLYAMINES AND SULFUR AND COMPOSITIONS CONTAINING THE SAME
Richard J. Lee, Downers Grove, and Samuel W. Harris, Lansing, Ill., assignors to Standard Oil Company, Chicago, Ill.
No Drawing. Filed Feb. 24, 1971, Ser. No. 118,468
Int. Cl. C07c *161/00*
U.S. Cl. 260—132                                                     6 Claims

ABSTRACT OF THE DISCLOSURE

Oil-soluble compounds are prepared by reacting a nitro-nitrito alkane containing at least ten carbon atoms, an alkylene polyamine, and sulfur in the molar ratio of from about 1.0:0.03:1.0 to about 1.0:0.5:2.0, respectively; compounds so formed are useful anti-rust additives in oleaginous compositions.

BACKGROUND OF THE INVENTION

It is known that the nitration of olefins containing at least ten carbon atoms with nitrogen tetraoxide or nitrogen dioxide, under nonoxidizing conditions, forms the corresponding nitro-nitrito alkanes as described in U.S. Pat. No. 3,328,463.

SUMMARY OF THE INVENTION

In accordance with the present invention, useful oil-soluble compounds are formed by heating (a) a nitro-nitrito alkane containing at least about ten carbon atoms, (b) an alkylene polyamine, and (c) sulfur in the molar ratio of from about 1.0:0.03:1.0 to about 1.0:0.5:2.0, respectively, at a temperature of from about 100° F. to about 400° F. for a period of from about two to about six hours. The reaction is suitably conducted in the presence of a non-reactive organic solvent, which is removed, after completion of the reaction, by suitable well-known means such as by distillation or by stripping of the solvent, using a nitrogen purge if desired. Water of reaction is preferably removed by distillation under vacuum.

Nitro-nitrito alkanes containing at least about ten carbon atoms prepared by any means can be used. A suitable method of obtaining such nitro-nitrito alkanes is by the nitration of alkenes or substantially olefinic hydrocarbons, under non-oxidizing conditions, with nitrogen trioxide ($N_2O_3$) gas, or nitrogen tetraoxide ($N_2O_4$), in an inert carrier gas, such as carbon dioxide or nitrogen, at a temperature of from about 100° F. to about 250° F. until absorption of the nitrogen oxide ceases. The amount of nitrogen oxide used is about one mol per mol of unsaturation in the unsaturated material to be nitrated. The nitration is preferably conducted in an inert solvent, such as an aliphatic or aromatic hydrocarbon solvent.

Any alkene, or substantially aliphatic hydrocarbon having at least one ethylenically unsaturated site, can be so nitrated. Such hydrocarbons include, for example, olefins and olefin polymers containing at least ten carbon atoms, liquid petroleum oils, solvent extracted petroleum oils, etc. Particularly suitable olefins are $C_2$ to $C_4$ monoolefin polymers having an average molecular weight in the range of from about 150 to about 100,000, preferably about 200 to about 3,000. A particularly suitable class of nitro-nitrito alkanes are those prepared from polypropenes and polybutenes having an average molecular weight in the range of from about 150 to about 3,000, preferably about 300 to about 2,500.

Alkylene polyamines used in the present invention are the polyamines having the general formula $$H_2N(RNH)_xH$$

wherein R is $C_{2-8}$ alkylene and $x$ is 1 to 8. Illustrative of such polyamines are ethylene diamine, diethylene triamine, triethylene tetramine, tetraethylene pentamine, propylene diamine, butylene diamine, dipropylene triamine, tributylene triamine, pentaethylene hexamine, tetraheptylene pentamine, trioctylene tetramine, etc.

PREFERRED EMBODIMENT OF THE INVENTION

The following example is illustrative of a preferred embodiment of the present invention:

A nitro-nitrito alkane was prepared by treating in an inert nitrogen atmosphere a solution of 1,000 grams of a polybutene (average molecular weight 300) in about 200 cc. hexane with nitrogen trioxide gas, at a rate of 2 cubic feet per hour, at a temperature of 90–120° F. for a period of four hours. The product was then purged with dry nitrogen for two hours to remove all dissolved gases.

To 400 grams (1.0 mol) of the nitro-nitrito polybutane, prepared as above, was added 10 grams (0.05 mol) of tetraethylene pentamine and 40 grams (1.25 mol) of sulfur flour, and the mixture reacted at a temperature of 100° F. with nitrogen purging for four hours. The reaction product was then filtered to remove any unreacted sulfur. The recovered product contained 2.14% nitrogen and 10.17% sulfur.

To determine the rust and/or corrosion inhibiting properties of the compound of the present invention, the product of the example, supra, was subjected to two tests designed to evaluate the rust and/or corrosion inhibiting properties of the additives. One such test is the ASTM D–665 Rust Test, and the other is the International Harvester BT–9 Humidity Corrosion Test, a test method procedure designed for determining the corrosion protection provided by fuels and lubricants to a finished ferrous surface under dynamic humidity conditions. Briefly, in the BT–9 Test a 9/16 by 12 inch steel rod test specimen, cleaned according to the test specifications, is immersed six times per minute for one minute in the fluid to be tested, and the test specimen suspended for 30 minutes to allow the fluid to drain. The drained specimen is then suspended in a stoppered 500 cc. flask containing 100 cc. distilled water and a 25 cc. flask containing 15 cc. distilled water. The flask assembly is then placed in a water bath maintained at 90° F., and kept therein until failure, as defined by the test procedure. At the end of the test the specimen rod is vapor cleaned with a boiling mixture of 50% toluene and 50% methanol. Failure is defined as six or more rust spots per linear inch, as viewed without magnification.

The following oil formulations were subjected to the above tests, and the results obtained are shown in Table I:

FORMULATION A

| | Percent |
|---|---|
| Solvent-extract SAE–5 mineral lubricating oil | 98 |
| Product of example above | 2 |

FORMULATION B

| | Percent |
|---|---|
| Solvent-extracted SAE–30 mineral lubricating oil | 98 |
| Product of example above | 2 |

TABLE I

ASTM D–665 rust test

| | |
|---|---|
| Control—solvent-extracted SAE–5 mineral lubricating oil (40% rusted) | 6 |
| Formulation A (1% microscopic rust) | 9.7 |

BT–9 corrosion test

| | Hours to fail |
|---|---|
| Control—solvent-extracted SAE–30 mineral lubricating oil | 1 |
| Formulation B | 6–8 |

The compounds of the present invention are useful as additives in hydrocarbon fuels and in solid and liquid oleaginous lubricant compositions to impart rust inhibiting properties thereto. The amount used in fuel compositions usually ranges from about 0.01% to about 1.0%, and in lubricant compositions from about 0.1% to about 10%. Liquid oleaginous lubricants comprise lubricating hydrocarbon oils, e.g., petroleum oils, synthetic lubricating oils, such as those obtained by the polymerization of hydrocarbons, and other well-known synthetic lubricating oils. Concentrates containing more than 10%, e.g., from about 15% to about 50% or more of the compounds of the present invention, alone or in combination with other additives, in a suitable oil base can be used for blending with hydrocarbon fuels and lubricants in proportions desired for the particular conditions of use to give a finished product containing from about 0.1% to about 10% of the compounds of the present invention.

Lubricant compositions and fuel compositions containing compounds of the present invention can contain, if desired, other addition agents, such as antioxidants, pour point depressors, anti-wear agents, viscosity index improvers, etc.

Percentages given herein and in the appended claims are weight percentages, unless otherwise stated.

While a particularly preferred embodiment of the present invention has been described, it is to be understood that the invention is not limited thereto, but includes such modifications and variations as come within the spirit and scope of the appended claims.

We claim:

1. The oil-soluble composition of matter prepared by the process comprising: reacting (a) a nitro-nitrito alkane derived from a hydrocarbon polymer of a $C_2$ to $C_4$ olefin, said polymer having an average molecular weight of from about 150 to about 100,000, (b) an alkylene polyamine having the formula $H_2N(RHN)_xH$ wherein R is $C_{2-8}$ alkylene and $x$ is 1 to 8, and (c) sulfur, in the molar ratio of from about 1.0:0.03:1.0 to about $$1.0:0.5:2.0,$$

respectively, at a temperature of from about 100° F. to about 400° F. for a period of from about two to about six hours.

2. The composition of claim 1 in which said polymer is polybutylene having an average molecular weight of from about 150 to about 3,000.

3. The composition of claim 1 in which said polymer is polypropylene having an average molecular weight of from about 150 to about 3,000.

4. The composition of claim 1 in which said polyamine is triethylene tetramine.

5. The composition of claim 1 in which said polyamine is tetraethylene pentamine.

6. The composition of claim 1 in which said polymer is a polybutene having an average molecular weight of 300, said polyamine is tetraethylene pentamine, said molar ratio is 1.0:0.05:1.25, said temperature is 100° F., and said period is 4 hours.

References Cited

UNITED STATES PATENTS 2,312,750   3/1943   Cohen _____ 260—125

LEWIS GOTTS, Primary Examiner

D. R. PHILLIPS, Assistant Examiner

U.S. Cl. X.R.

44—72; 252—391, 475; 260—125, 138